(12) United States Patent
Veltrop et al.

(10) Patent No.: US 8,727,304 B2
(45) Date of Patent: May 20, 2014

(54) PINCH BAR

(75) Inventors: Loren Veltrop, Chicago, IL (US); Christopher Lyons, LaGrange Park, IL (US); Michael Pearson, LaGrange, IL (US)

(73) Assignee: Prince Castle, LLC., Carol Stream, IL (US)

(*) Notice: Subject to any disclaimer, the term of this patent is extended or adjusted under 35 U.S.C. 154(b) by 277 days.

(21) Appl. No.: 13/169,509

(22) Filed: Jun. 27, 2011

(65) Prior Publication Data

US 2012/0326061 A1 Dec. 27, 2012

(51) Int. Cl.
*F16K 7/06* (2006.01)
*B65D 90/56* (2006.01)

(52) U.S. Cl.
USPC .................................. 251/7; 251/98; 251/101

(58) Field of Classification Search
USPC ....................... 251/4, 7, 95, 98–105
See application file for complete search history.

(56) References Cited

U.S. PATENT DOCUMENTS

| | | | |
|---|---|---|---|
| 3,939,864 A * | 2/1976 | Donnelly | 137/385 |
| 5,340,211 A | 8/1994 | Pratt | |
| 5,769,385 A * | 6/1998 | Burrous et al. | 251/7 |
| 5,778,928 A * | 7/1998 | Boland et al. | 137/588 |
| 5,797,519 A | 8/1998 | Schroeder et al. | |
| 5,921,440 A | 7/1999 | Maines | |
| 6,012,342 A * | 1/2000 | Blight et al. | 73/862.621 |
| 6,186,361 B1 * | 2/2001 | Teetsel, III | 222/1 |
| 6,253,957 B1 | 7/2001 | Messerly et al. | |
| 6,386,505 B2 * | 5/2002 | Schob | 251/7 |
| 6,497,343 B1 | 12/2002 | Teetsel, III | |
| 6,575,252 B2 * | 6/2003 | Reed | 169/90 |
| 6,659,311 B2 | 12/2003 | Prueter | |
| 6,792,966 B2 | 9/2004 | Harvey | |
| 6,883,773 B1 * | 4/2005 | Mattheis | 251/7 |
| 7,337,920 B2 | 3/2008 | Duck et al. | |
| 7,527,178 B2 * | 5/2009 | Lewis | 222/333 |
| 2007/0192981 A1 | 8/2007 | Lawshe | |
| 2007/0267446 A1 | 11/2007 | Pressler | |
| 2009/0250491 A1 | 10/2009 | Erman et al. | |
| 2010/0065587 A1 | 3/2010 | Erman et al. | |
| 2012/0068093 A1 * | 3/2012 | Veltrop et al. | 251/7 |

FOREIGN PATENT DOCUMENTS

| | | |
|---|---|---|
| WO | WO 9425354 | 11/1994 |
| WO | WO 2004037595 | 5/2004 |
| WO | WO 2005030276 | 4/2005 |
| WO | WO 2008153535 | 12/2008 |
| WO | WO 2010/038047 | 4/2010 |

OTHER PUBLICATIONS

Silver King® , Majestic Series Milk Dispensers specification sheet FNSKMAJ09, 2009.

(Continued)

*Primary Examiner* — John K Fristoe, Jr.
*Assistant Examiner* — Daphne M Barry

(57) ABSTRACT

A pinch bar for a pinch valve is comprised of a coil spring coupled to one end of an actuating rod. An opposite end of the rod is formed with, or is coupled to a device or surface, which applies a pinch force. The actuating rod slides through a fixed-in-place rod actuator. The rod actuator, spring and actuating rod thus provide a mechanism that applies a closing force inwardly, into or directed toward a cabinet attached to which is a valve body for the pinch bar and against which the pinch bar could exert a tube-closing force.

18 Claims, 6 Drawing Sheets

(56) References Cited

OTHER PUBLICATIONS

Silver King® Cream Dispenser, Model SKMCD1P, equipment manual for McDonald's Corporation®, 2005.

SureShot® Dispensing Systems, Advance Portion Controlled Refrigerated Liquid Dispensers specification sheet, A.C. Dispensing Equipment, Lower Sackville, Nova Scotia Canada, Jan. 2011.

SureShot® Dispensing Systems, Suggested Preventive Maintenance Checklist for Refrigerated Liquid Dispenser, A.C. Dispensing Equipment, Lower Sackville, Nova Scotia Canada, Sep. 2006.

SureShot® Intellishot Dispensing System Specification; A.C. Dispensing Equipment Inc., Sep. 2007.

Fluid Mechanics, Fundamentals and Applications; Yunus A. Cengal and John M. Cibal; chapter 12: Radiation Process and Properties, McGraw Hill, Higher Education, copyright 2006.

Fundamentals of Fluid Mechanics Fifth Edition; Bruce R. Munson, Donald F. Young, and Theodore H. Okiishi; copyright 2006.

SureShot® Flexoshot, A.C. Dispensing Equipment Inc., Lower Sackville, Nova Scotia Canada, Sep. 2007.

* cited by examiner

PINCH BAR

BACKGROUND

A pinch valve is a valve operable with a flexible tubing or hose, which is capable of pinching the tube or hose using a tube-pinching mechanism such as a pinch bar. Pinch valves are typically full bore, linear action valves that can be used in an off/on manner. However, some pinch valves can be used in a variable position or a throttling service.

Pinch valves are used in many medical and pharmaceutical applications. They are also used in food dispensing applications. A main advantage of pinch valves is that they facilitate cleanliness, excellent drainage, and ease of cleaning. In addition to cleanliness, another advantage of pinch valves is their operational speed. Most pinch valves are simply on-off valves, i.e., they open and close a flexible tube using a pinch bar that moves between two positions. Moving a pinch bar through two, fixed locations can be done quickly, especially if the pinch bar is moved by an electrically-actuated solenoid.

A problem with prior art pinch valves, especially those used with bulk liquid dispensers, is that they typically direct a pinch bar outwardly, i.e., away from a cabinet holding a bulk liquid container. When a pinch bar is directed away or outwardly from a cabinet, a surface needs to be provided by the valve or the cabinet in order for the pinch bar to work. Eliminating the need for such a surface would be an improvement.

DETAILED DESCRIPTION

Figure 8:
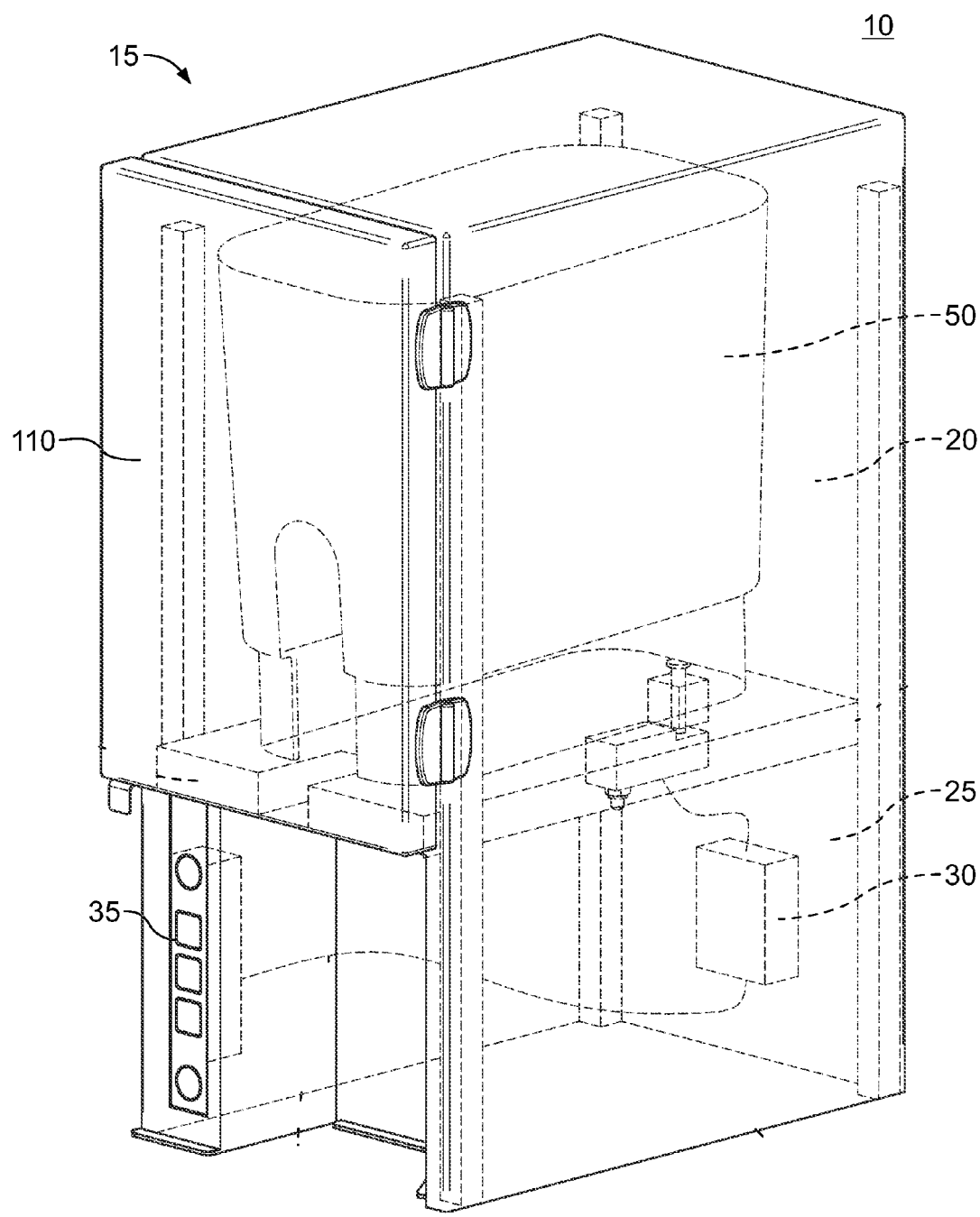
FIG. 8 is a perspective view of a dispenser of small volumes of liquids.

FIG. 8 is a perspective view of a liquid dispenser apparatus 10 for dispensing specific volumes of liquids. The liquids that can be dispensed have viscosities that vary from about 1 centipoise to about 7500 centipoise. The dispensable liquids thus include low viscosity alcohols, water, juices, moderate viscosity liquids like dairy products such as milk and cream, and viscous liquids that include oils including petroleum products and syrups. The dispensable volumes range from fractions of a liquid ounce up to volumes measured in gallons. An important feature of the apparatus is that unlike prior art dispensers, the apparatus 10 permits an operator to manually dispense any volume of liquid and immediately thereafter, resume accurately dispensing user-requested fixed volumes without losing accuracy of the dispensed volumes.

The apparatus 10 is comprised of a cabinet 15 having a refrigerated upper compartment 20 and an unrefrigerated lower compartment 25. A hinged door 110 provides access to the interior of the upper compartment 20 and to the lower compartment 25. The lower compartment 25 encloses refrigeration equipment used to keep the upper compartment cold. Refrigeration equipment is well known and omitted from the figures for clarity.

The lower compartment 25 also encloses a control computer 30. The computer 30 is preferably embodied as a single-chip microcontroller with on-board memory. Such microcontrollers are well known to those of ordinary skill in the art. Many of them have electrical interfaces on the microcontroller which send and receive electrical signals to and from other circuitry and devices, not shown but which interface, i.e., electrically connect, the computer 30 to peripheral devices that include an array of push-button, operator-actuated dispensing control switches 35, a dispensing control valve not visible in FIG. 8. The dispensing valve is a pinch valve. The pinch valve pinches off, i.e., closes, a flexible dispensing tube that extends from the container 50.

Figure 1:
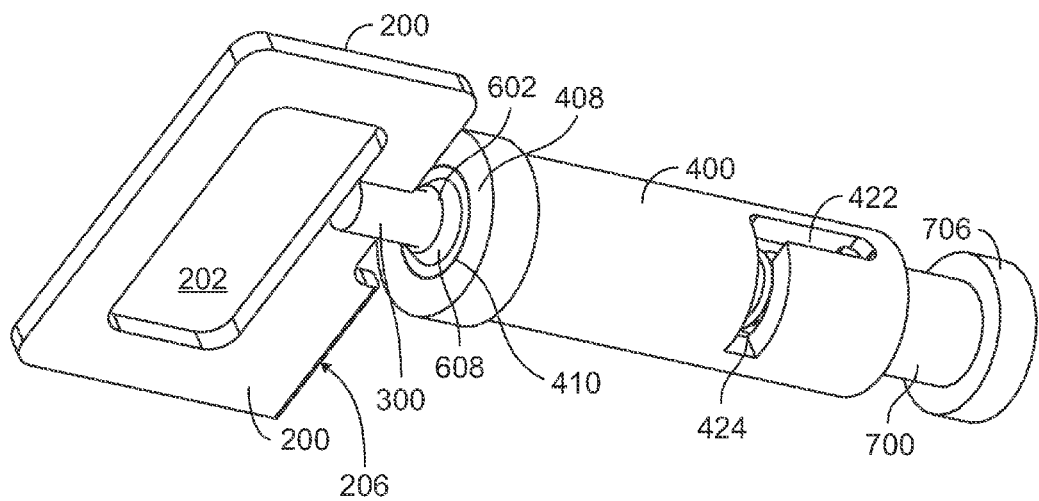
FIG. 1 is a first perspective view of a pinch bar for a pinch valve, which has an enclosed retractor spring.
Figure 2:
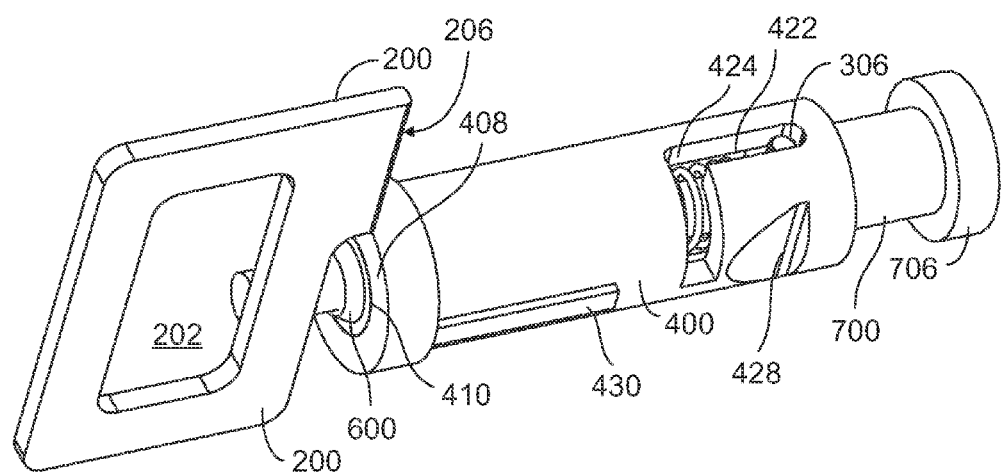
FIG. 2 is a second perspective view of the pinch bar when viewed from above the pinch bar and to its left-hand side.
Figure 3:
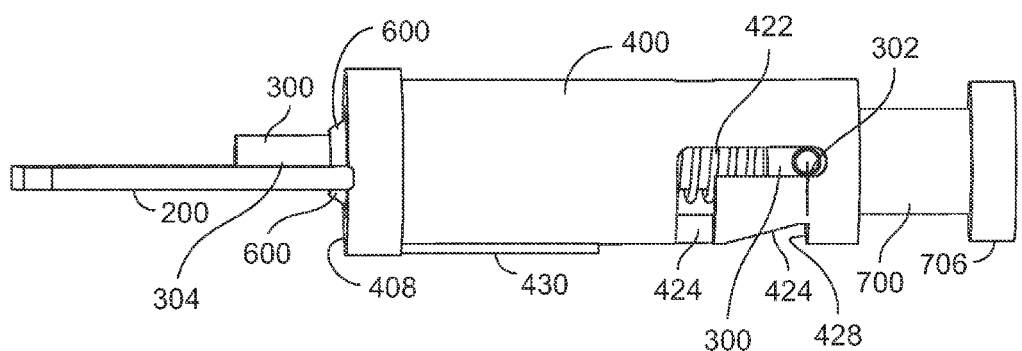
FIG. 3 is a side view of the pinch bar when the pinch bar is viewed from its right-hand side.
Figure 4:
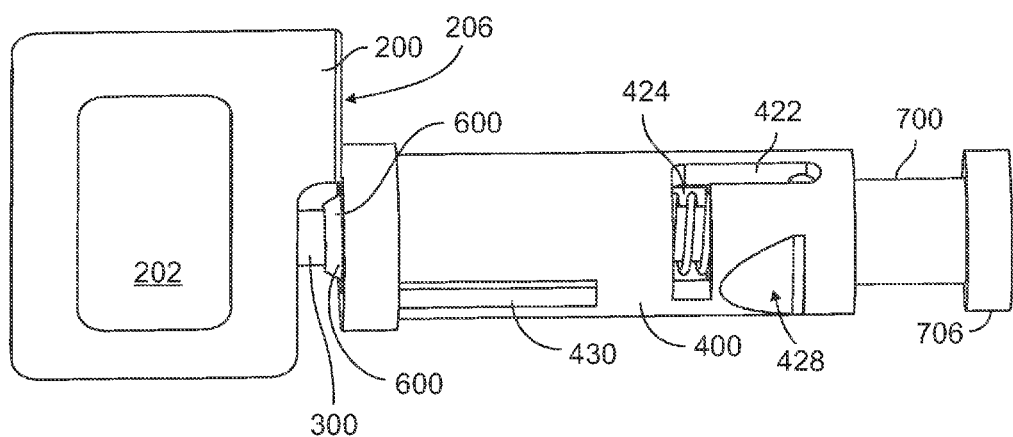
FIG. 4 is a top view of the pinch bar.
Figure 5:
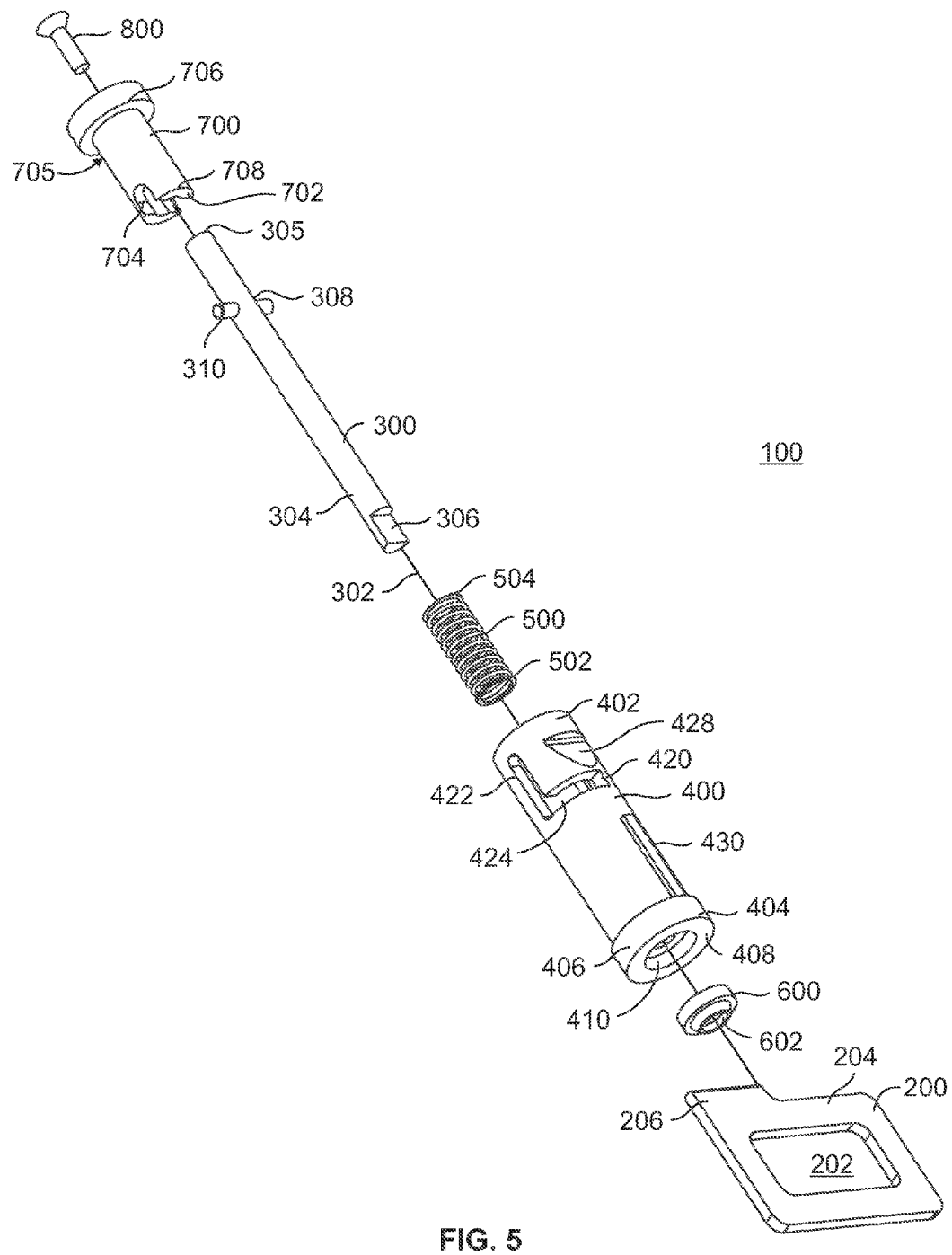
FIG. 5 is an exploded view of the pinch bar.
Figure 6:
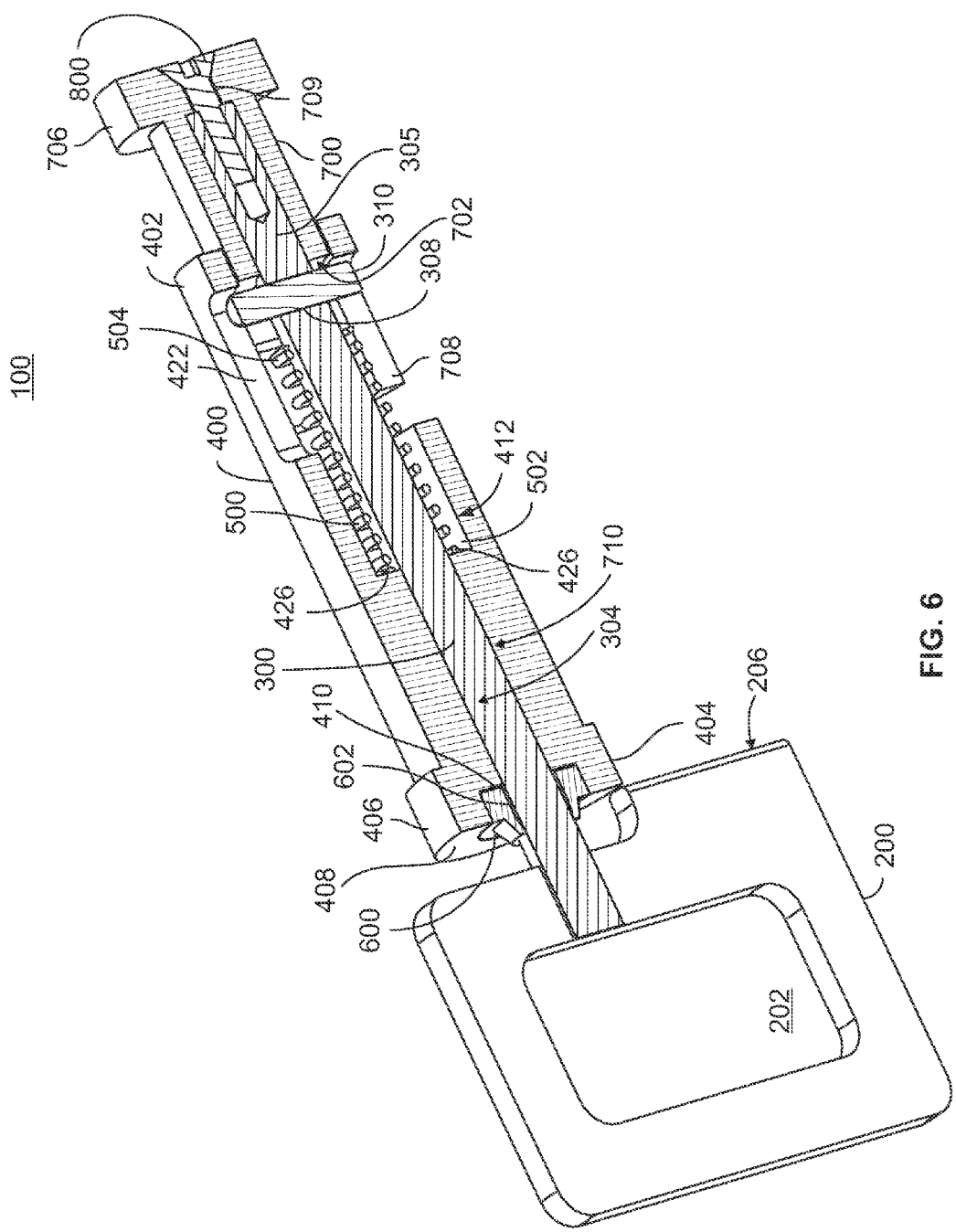
FIG. 6 is a cross-sectional view of the assembled pinch bar.

FIG. 1 is a first perspective view of a pinch bar 100 for a pinch valve, which has an enclosed retractor spring. FIG. 1 is a view of the pinch bar 100 when it is viewed from below the pinch bar 100 and to its right-hand side. FIG. 2 is a second perspective view of the pinch bar 100 when the pinch bar 100 is viewed from above the pinch bar and to its left-hand side. FIG. 3 is a side view of the pinch bar 100 when the pinch bar 100 is viewed from its right-hand side. FIG. 4 is a top view of the pinch bar 100. FIG. 5 is an exploded view of the pinch bar 100. FIG. 6 is a cross-sectional view of the assembled pinch bar shown in FIG. 1.

Figure 7:
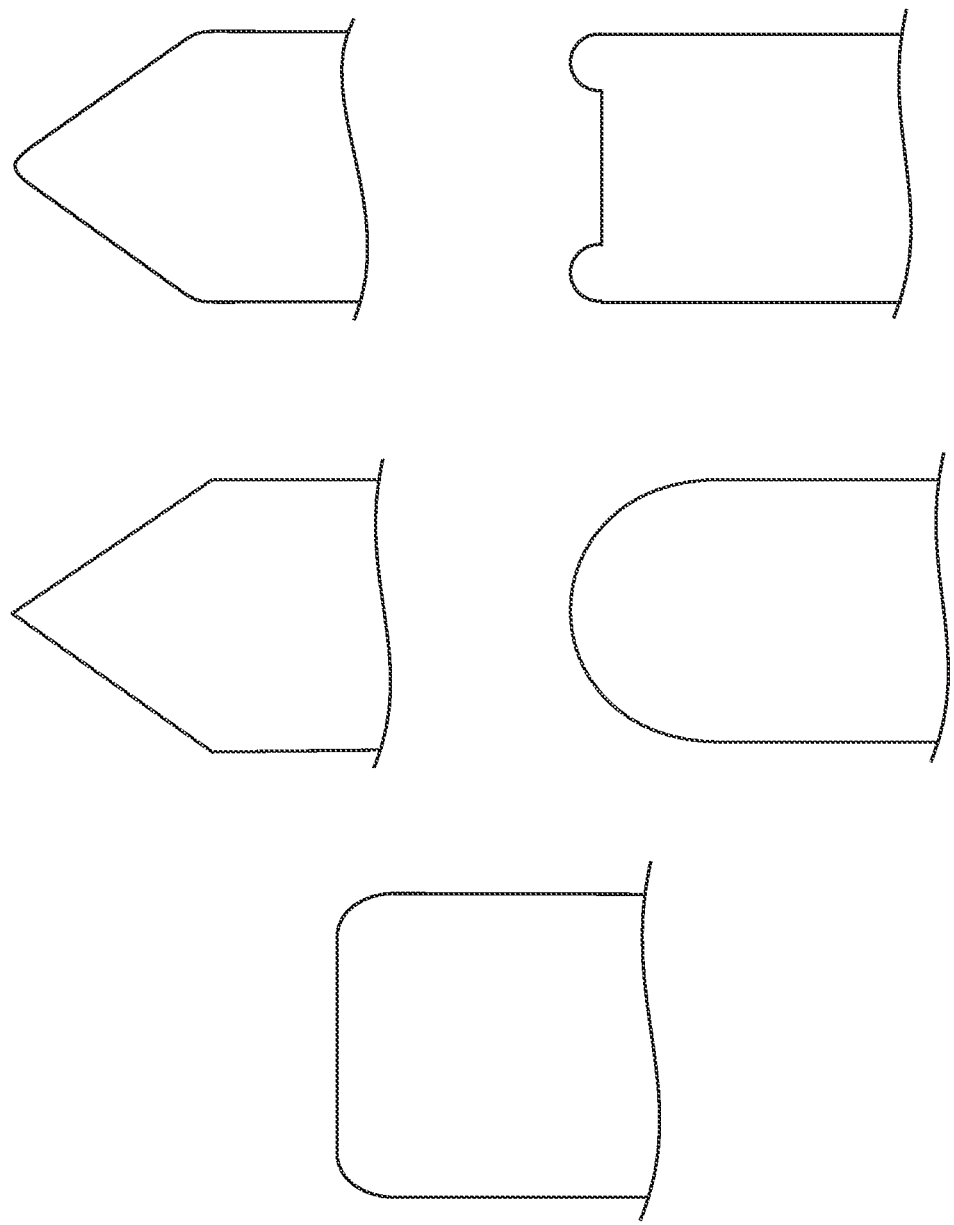
FIG. 7 depicts different but equivalent cross sections for a pinching surface.

Referring to FIG. 1, the pinch bar 100 is comprised of a handle 200, which also provides the pinching surface 206 to close off or pinch off a flexible tube placed between the pinching structure and a valve body surface, not shown. Inasmuch as the handle 200 disclosed herein is formed to also provide a pinching surface 206, the handle 200 is also considered herein to be a pinching device. The pinch surface 206 is preferably an edge through which can have different cross sections or profiles, such as those shown in FIG. 7. The cross sections shown in FIG. 7 are considered to be equivalent pinching surfaces.

The handle 200 is a substantially flat or planar, rectangle, a central region 202 of which is open to facilitate grasping the handle 200. The size of the opening in the central region 202 is large enough to allow at least one finger to be inserted into the central region 202 in order to pull the handle, and thus the pinch bar 100 away from a valve body, not shown but against which the pinch surface 206 applies a pinching, closing force to a flexible tube.

As shown in FIGS. 3 and 5, the handle 200 is attached to an elongated rod 300 having a circular cross section, a center axis 302 and first and second opposing ends. The first end 304 of the rod 300 has a flattened portion 306, which provides a surface to which the handle 200 can be attached using screws, an adhesive or both, neither of which are shown but well known to those of ordinary skill in the mechanical arts.

In an alternate embodiment, the elongated rod 300 is bent or "L-shaped" as shown in FIGS. 2 and 3 of the applicant's co-pending patent application Ser. No. 12/885,641, filed Sep. 20, 2010, entitled "Pinch Valve." The content of application Ser. No. 12/885,641 is incorporated herein by reference in its entirety. L-shaped pinch bars or rods are identified in FIGS. 2 and 3 by reference numeral 40. An advantage of an L-shaped or bent pinch bar is that one "leg" of the L-shaped bar is a pinching device.

In FIG. 5, a through-hole 308 is formed into the rod 300 near its second or terminal end 304 and orthogonal to the center axis 302. A retaining pin 310, which has a length greater than the diameter of the rod 300, is driven into the through-hole 308 such that a portion of the pin 310 projects outwardly from both ends of the through-hole 308. The retaining pin 310 provides a stop by which the pinch bar 100 can be latched into an open position by pulling the handle 200 and thus pulling the rod 300 at least part way through a cylindrically-shaped rod actuator 400, which encloses a coil retraction spring 500 that encircles the rod 300.

As used herein, the term "spring" refers to any device that returns to an original shape after being compressed or stretched. Because of their ability to return to their original shape, springs are used to store energy. A spring can be formed as a coil or a strip. A twisted or twistable rod or bar can also act as a spring and sometimes referred to as torsion bar.

Alternate embodiments of the pinch bar 100 use a rod 300 having a non-circular cross section. As used herein, the term "rod" should be construed to include the rod 300 depicted in the figure with a circular cross section as well as rods having non-circular cross sections. The rod 300 can also be non-metallic. The term "rod" should therefore be construed to include a relatively thin straight piece or bar having a cross section that is substantially as well as perfectly: circular, oval, square, rectangular or triangular. The "rod" can be metal, metallic or non-metallic. Non-metallic and non-metal rods include those made from plastics, carbon fiber or fiberglass.

In FIG. 5, the rod actuator 400 has an open first end 402 and a second end 404 having an enlarged portion 406, the outside diameter of which is greater than the outside diameter of the rod actuator 400. The top 408 of the enlarged portion 406 is formed with a flat-bottomed hole 410, the diameter of which is chosen to provide an "interference" fit to a plastic, nylon or rubber O-ring or shaft seal 600. The outside surface of the rod actuator 400 is provided an alignment key 430. The alignment key 430 prevents the pinch bar 100 from rotating inside the valve body. A notch 428 is cut or formed into the outside surface of the rod actuator 400 to provide a detent for a valve body retaining clip or latch, not shown.

Since the cross section of the rod is circular, the shaft seal 600 is essentially an annulus. It has an outside diameter selected to fit inside the flat-bottomed hole 410 and an open and centrally-located hole 602. The hole 602 is sized to receive the rod 300 and allow the rod 300 to slide in the hole 602 yet provide a substantially water-tight fit between the shaft seal 600 and the rod 300. The shaft seal 600 helps keep liquids from migrating into the actuator. When non-circular cross-sectioned rods are used, the shape of the shaft seal 600 will either require change or the shaft seal 600 can be omitted.

In FIG. 6, the coil spring 500 has a first end 502 and an opposing second end 504. The spring 500 also has an outside diameter selected to fit inside the inside diameter 412 of the rod actuator 400. The first end 502 of the spring 500 abuts a backside surface 426 inside the rod actuator 400. The backside surface 426 thus constitutes an abutment for the spring 500, the abutment being located inside the rod actuator. The opposite second end 504 of the spring 500 presses against the top surface 702 of a spring stop 700.

In FIG. 5, the spring stop 700 has a cylindrical main portion 705 and a cylindrical bottom or base portion 706. The main portion 705 also has a top end 708. A central hole 710, which is visible only in FIG. 6, extends completely through the spring stop 700. The portion of the central hole 710 near the top end 708 of the spring stop 700 has an inside diameter selected to receive the bottom or first end 304 of the rod 300. In FIG. 5, a slot 704 is formed into the main portion 705 at the top end 708 and which is orthogonal to the central hole 710. The slot 704 is sized to receive the retaining pin 310 that is pressed into the through-hole 308 in the rod 300. The slot 704 thus allows a portion of the rod 300 to extend into the central hole 710 formed into the spring stop 700. As best seen in the sectional view FIG. 6, the rod 300 extends almost all the way through the spring stop 700.

The base portion 706 of the spring stop 700 has a hole 709 that receives a threaded fastener 800. The threaded fastener 800 slides through the hole 709 and is screwed into mating threads formed into the second end 304 of the rod 300. The fastener 800 rigidly attaches the spring stop 700 to the rod 300.

As shown in FIGS. 1-4, the rod actuator 400 is formed with two, substantially L-shaped slots identified by reference numerals 422 and 424. Both slots have widths greater than the outside diameter of the retaining pin 308 to allow the retaining pin 308 to slide freely in them.

A first slot portion 422 is parallel or substantially parallel to the central axis 302 of the rod 300. It has a length, parallel to the center axis 302, which determines the distance that the rod actuator 400 will travel along the axis 302 of the rod 300. A second slot portion 424 is also formed through the wall of the rod actuator 400. The second slot portion 424 is orthogonal to the first slot portion 422. The retaining pin 308 slides back and forth in the first slot portion 422 when the rod actuator 400 is slid or translated along the axis 302 of the rod 300. As best seen in FIGS. 3 and 4, when the rod actuator 400 is moved leftward, or when the rod 300 is moved rightward, retaining pin 308 moves in the first slot portion 422 toward the second, orthogonal second slop portion 424. When the pin 308 is at the corner formed by the two slot portions 422 and 424, the rod actuator 400 can be rotated around the rod 300 (or the rod 300 rotated inside the rod actuator 400), causing the retaining pin 308 and second slot portion 424 to move relative to each other, translating the retaining pin 308 into the second slot portion 424. The L-shaped slots 422 and 424 thus define or limit the travel distance of the rod actuator 400 relative to the rod 300. In addition, they provide a locking or latching mechanism for the pinch bar 100 when the pinch bar 100 is installed into a pinch valve body.

When the pinch bar 100 is assembled as shown in FIG. 6, the first end 304 of the rod 300 is able to slide freely in the hole 602 formed into the shaft seal 600. The second end 305 of the rod also slides freely into the central hole 710 formed into the spring stop 700. As described above, the screw 800 attaches the spring stop 700 to the bottom end 305 of the rod 300. Since the spring 500 has a length selected to be greater than the length of the interior of the rod actuator 400, when the spring is compressed, as happens when the pinch bar 100 is assembled as shown in FIG. 6, the spring 500 will exert equal force in the opposite direction. The compressed spring 500 imparts a force against the top end 708 of the spring stop 700 and an equal but opposite force against the backside surface 426 of the rod actuator 400. The compressed spring 500 thus urges the rod actuator 400 and the spring stop 700 away from each other.

When the pinch bar 100 is assembled as shown in FIG. 6 and when the rod actuator 400 of the pinch bar 100 is fixed in place, relative to the rod 300 and spring 500, tension in the coil spring 500 will apply a bias force against the spring stop 700 attached to the rod 300. This will drive the spring stop 700, and everything connected to it, away from the rod actuator 400. Since the spring stop 700 is attached to the rod 300, the force that the spring 500 applies to the top end 708 of the spring stop 700 will drive the rod 300, and the handle 200 attached to the rod 300, in the same direction, i.e., toward the rod actuator 400. Since the pinch surface 206 is part of the handle and thus coupled to the rod 300 through the handle 200, the spring 500 inside the rod actuator 400 will cause the pinching surface 206 of the handle 200 to exert force toward the rod actuator 400 and against the tubing that is placed between the pinching surface 206 and the valve body.

An advantage of the pinch bar 100 disclosed above is that it provides a self-contained i.e., enclosed, retractor spring that provides a pinch bar closing force directed inwardly or into a valve body that holds or retains the rod actuator 400. Another advantage is that the pinch bar can be operated (opened) electrically, by configuring a solenoid to direct a force into the spring stop, as well as manually by having a user grasping the handle and pulling outwardly from the actuator 400, without modification. Even if there is a solenoid configured to drive the bar 200 forwardly to open a pinch valve, pulling the handle outwardly will open the valve. Rotating the handle can latch the pinch bar into an open position.

When a valve body configured to hold the pinch bar 100 is attached to a liquid dispenser, the spring 500 will draw a closing, pinching surface 206 of the handle 200 inwardly, i.e., into or toward, a liquid dispenser to which a pinch valve body is attached. This is unlike prior art pinch valves and pinch bars that direct a closing force outwardly or away from the liquid dispenser. The pinch bar 100 can thus be used with pinch valves that require application of a pinching force directed toward, at or into the front side of a cabinet holding a bulk liquid container. As used herein, the terms "front" and "front side" refer to a surface, face, panel or side of a cabinet from which liquids can be dispensed using a pinch valve and which an operator or user of such a valve would face when operating or using a pinch valve. An example of such a cabinet includes the refrigerated cabinet disclosed in co-pending patent application Ser. No. 12/885,659, entitled "Dispenser for Liquids" filed on Sep. 20, 2010, which is assigned to the assignee of this application, the content of which is incorporated herein in its entirety. An example of such a pinch valve and a similar cabinet are also disclosed in the aforementioned application Ser. No. 12/885,641 entitled "Pinch Valve," which is also assigned to the assignee of this application and which is also incorporated herein by reference in its entirety.

The foregoing description is for purposes of illustration. The true scope of the invention is set forth in the appurtenant claims.

What is claimed is:

1. A pinch bar for a pinch valve, which is used with a refrigerated cabinet of a liquid dispenser, the pinch bar comprising:
   a handle;
   a pinching surface, configured to apply a pinching force, the pinching force being applied through the pinching surface in a direction that is toward a front side of the refrigerated cabinet;
   a rod, which is coupled to the handle and coupled to the pinching surface, the rod having first and second opposing portions, the first portion being coupled to the handle and the pinching surface, the second portion being coupled to a spring; and
   a coil spring having first and second ends and extending around a portion of the rod located between the first and second opposing portions of said rod, the coil spring first end being coupled to the second portion of the rod;
   wherein the spring provides a pinching force to the rod, the handle and the pinching surface, the handle, rod, spring and pinching surface being configured to apply the pinching force toward the front side of the refrigerated cabinet.

2. The pinch bar of claim 1, wherein the rod has a portion located between the first and second ends and which has a circular cross section, wherein the rod additionally has first and second opposing ends, the first end of the rod having a flattened portion to which the handle is attached.

3. The pinch bar of claim 1, further comprising a rod actuator comprising a tube having first and second open ends and an interior, the interior being sized and shaped to receive the coil spring therein, the rod, rod actuator and spring being configured such that the rod passes through the rod actuator and passes through the center of the coil spring.

4. The pinch bar of claim 3, wherein the rod actuator comprises an L-shaped slot formed through the tube, the L-shaped slot having a first portion oriented in a direction substantially parallel to the rod, the first portion of the L-shaped slot having first and second ends, the L-shaped slot having a second portion oriented in a direction substantially orthogonal to the first portion of the slot and extending away from the first end of the first portion of the L-shaped slot;
   wherein the rod of the pinch bar further comprises a retaining pin configured to slide back and forth in the first portion of the L-shaped slot responsive to translational movement of the bar and handle, the retaining pin configured to slide into the second portion responsive to the rotation of the bar when the retaining pin is at the first end of the first portion of the L-shaped slot.

5. A pinch bar for a pinch valve, the pinch valve being for a cabinet of a liquid dispenser, the pinch bar comprised of:
   a handle having a pinching surface;
   a coil spring having first and second ends; and
   a rod having first and second opposing ends, the rod extending through said coil spring and having its first end attached to said handle, the second end of the rod being coupled to said second end of the coil spring, the coil spring and rod configured to direct a pinching force through the pinching surface, into a front surface of the cabinet.

6. The pinch bar of claim 5, wherein the handle has a perimeter surface and wherein the pinching surface is formed on the perimeter surface of the handle.

7. The pinch bar of claim 5, wherein the pinch valve is configured to be operated both electrically and manually.

8. A pinch bar for a pinch valve, the pinch valve being with a cabinet of a liquid dispenser, the pinch bar comprised of:
   a coil spring having first and second ends;
   a rod having a length between first and second opposing ends, the first end of the spring being coupled to the first end of the rod;
   a handle having a perimeter, the handle perimeter having a pinch surface comprising a narrowed edge, the handle being coupled to the second end of the rod; and
   a rod actuator comprising a cylinder having first and second ends, the rod actuator being fixed in place relative to the rod and pinch surface and enclosing the coil spring;
   wherein the coil spring biases the pinch surface toward the rod actuator and into a front surface of the cabinet configured to hold the pinch valve.

9. The pinch bar of claim 8, wherein the rod has a portion between the first and second ends, which has a circular cross section and wherein the rod passes through the rod actuator.

10. The pinch bar of claim 9, wherein the rod passes through the spring.

11. The pinch bar of claim 8, further comprised of a pin through the rod and comprised of slots in the rod actuator, the pin and slots limiting the travel of the rod in the rod actuator and being configured to latch the rod in the rod actuator.

12. The pinch bar of claim 8, wherein the rod actuator is additionally comprised of an alignment key.

13. The pinch bar of claim 8, wherein the pinch bar is configured to exert pinching force in a direction that is toward a liquid dispenser.

14. The pinch bar of claim 8, wherein the rod is configured to be moved both electrically and manually.

15. A pinch bar for a pinch valve, the pinch valve being with a refrigerated cabinet of a liquid dispenser, the pinch bar comprising:
- a coil spring having first and second ends;
- a rod having a length and first and second ends, the first end of the rod being coupled to the first end of the spring;
- a spring stop fixed to the first end of the rod and abutting the first end of the coil spring;
- a substantially flat handle coupled to the second end of the rod, the handle having a central region, which comprises an opening that is sized, shaped and arranged to allow at least one finger to be inserted there through, the handle also having a pinch surface on an exterior edge of the handle facing a front side of the refrigerated cabinet;
- a rod actuator having a first end proximate the first end of the rod and having a second end abutting the second end of the coil spring;
- wherein tension in the coil spring biases the shaft actuator and the rod in opposite directions.

16. The pinch bar of claim 15, wherein the rod actuator is comprised of a cylinder having first and second ends and a wall, the first end of the cylinder being open, the second end of the cylinder being substantially closed to provide an abutment for the second end of the coil spring, the second end of the rod actuator having a hole sized, shaped and arrange to receive the rod therein.

17. The pinch bar of claim 15, wherein the second end of the rod actuator is provided with an annular shaft seal.

18. The pinch bar of claim 15, wherein the pinch valve is configured to be operated both electrically and manually.

\* \* \* \* \*